Patented Mar. 6, 1934

1,949,895

UNITED STATES PATENT OFFICE 1,949,895

PROCESS OF PRODUCING FOODSTUFFS

Luigi Bernardini, Rome, Italy

No Drawing. Application August 16, 1930, Serial No. 475,850. In Italy October 19, 1929

3 Claims. (Cl. 99—11)

This invention relates to a process of recovering vitamines, lipoid and phytine from by-products of plant seeds and to the use of such products in foodstuffs.

It is known that the embryos or germs of plant seeds and particularly of the kernels of cereals are the richest vegetable materials in vitamines, lipoid and phytine. Of the cereals, rice and corn contain these valuable products to the highest degree.

However, according to the present day method of converting cereals such as rice and corn into food products as by threshing and milling, the germs or embryos of the cereal kernels are treated as waste products. As a result, the food products obtained are deficient in vitamines, lecithines and phytine since these products remain in the discarded embryos or germs. Since these products have an enormous nutrition value, their presence in foodstuffs is necessary in order for the foodstuff to be biologically rational and complete.

Furthermore, I have found, in order for the foodstuffs to have their proper value, it is not merely sufficient to add one or more of the above compounds to the foodstuff in any proportion, but it is necessary to reintegrate the foodstuffs with all of said products in such a way that all the aliments are present in the same ratio as exist in the original seed. Because this fact was not hitherto known, attempts to solve the lack of the essential aliments in foodstuffs have proceeded more or less along the line of extracting one or more of the above products from materials containing them and adding the same in any proportion to the foodstuffs.

According to my process, I first obtain the above desired substances from cereals in the following manner.

From the by-products of cereal husking and milling, such as from the chaff of rice and the waste from the corn threshing machines, the embryos or germs of the cereal kernels are collected by sifting and ventilation. These embryos are then dried in warm air at a temperature not exceeding 60° C. The dried embryos are next extracted with an organic solvent, such as ethyl alcohol, at a temperature of about 50 to 60° C. and under reduced pressure in a rotary extractor. The alcoholic extract containing the dissolved lipoid is then distilled, preferably at reduced pressure and a temperature of not more than 50 to 60° C. to remove the alcohol. About 15% of an oil is thus obtained which upon standing, separates into two layers, the upper of which is more fluid and possesses a golden yellow color and the lower of which is more dense and has a deeper color. This oil or lipoid contains the lecithine and liposoluble (lipoid soluble) vitamines.

The extracted residue from the alcoholic extraction, is next moistened or levigated with water, milled and sifted to form a flour according to the usual method of milling. In this way, a product is obtained free from branny materials and very high in phytine and hydrosoluble vitamines.

The residue still remaining after removal of the above products, is rich in nitrogenous matter and also contains phytine and vitamines. This product may be used as such for enriching animal food or it may be treated by grinding and sifting to remove the greater part of the branny or cellulosic constituents and used for enriching special foodstuffs, such as bread and biscuits for diabetics The lipoid obtained in the above manner usually contains about 2 to 7% of lecithine and hence next to the human brain is the richest product in lecithine known in nature. In addition it is the richest product known in hydrosoluble vitamines.

Said lipoid is capable of forming with water or aqueous solutions or emulsions, emulsions which can be stabilized by the addition of small amounts of an alkali, such as soda or potash. Such a stabilized emulsion has a yolk yellow color, and the smell and taste as of a yolk beaten with water. It is therefore eminently suitable for making bread, biscuits, or other foodstuffs from flours or grits, such as is obtained by milling corn, or for preparing most of the usual foodstuffs which are to be reintegrated with the essential nutrients contained in the lipoid while giving the proper digestibility to the foodstuffs.

When employing the lipoid in this way it is possible to make the flour paste from the lipoid emulsion instead of from ordinary water as is now employed, by mixing the flour, to which 5 to 15% of phytine flour, as obtained above, has been added, with the lipoid emulsion.

The following example will serve to illustrate how foodstuffs prepared from grits (obtained by milling corn) may be reintegrated with the above mentioned desired aliments, although it is to be understood that my invention is not limited thereto.

500 to 1000 grams of lipoid are placed in a receptacle, preferably of the churn type. 5 liters of water and 5 cc. of soda and caustic potash of 50% strength are then added thereto while stirring. 100 kg. of semolina flour (grits) to which 5 to 15% of phytine flour has been added are then stirred into the mixture. When the mixture has been worked into a paste, it is extruded at a temperature of 60° C.

The amount of phytine flour added will vary from 5 to 15% depending upon whether the resulting foodstuff is to be used by children or adults.

As will be appreciated from the above, both layers of the lipoid will be used if the lipoid is employed to reintegrate foodstuffs, such as bread, flour and the like. On the other hand the two layers will be used separately if the lipoid is employed in oils or pharmaceutical emulsions containing lecithines and liposoluble vitamines.

While I have disclosed a preferred embodiment of my invention, it is to be understood that I do not intend to be limited in the patent granted thereon, except as necessitated by the prior art.

Having now particularly described and ascertained the nature of my said invention and in what manner the same is to be performed, I declare that what I claim is:

1. The process of producing cereal foodstuffs containing all the necessary vegetative and physiological nutrients which comprises extracting the embryos obtained as by-products in the milling of cereals with alcohol, distilling off the alcohol to obtain a lipoid, readily emulsifiable with water, milling the extracted residue to obtain a flour containing phytine, adding the phytine to the foodstuff to be reintegrated and mixing the foodstuff and phytine to the lipoid emulsion to form a paste, the ingredients of the foodstuff, the phytine and ingredients of the lipoid being present in the same ratio as in the original cereal kernel.

2. The process of producing a cereal foodstuff containing all the necessary vegetative and physiological nutrients, which comprises extracting lipoids from embryos of cereals resulting as a by-product in the milling of cereals, milling the extracted residue to produce a flour high in phytine and compounding the lipoids and phytine with a cereal product in such amounts that the resulting foodstuff contains the lipoids, phytine and cereal product in the same ratio as these substances exist in the original cereal kernel.

3. The process of producing a cereal foodstuff containing all the necessary vegetative and physiological nutrients which comprises extracting lipoids from the embryos of corn resulting as a by-product in corn milling, milling the extracted residue to produce a flour high in phytine and emulsifying the phytine flour and corn meal with the lipoids and added water to form a foodstuff, the corn product, lipoids and phytine being present in the same ratio as in the original corn kernels.

LUIGI BERNARDINI.